United States Patent Office 2,862,948
Patented Dec. 2, 1958

2,862,948

PRODUCTION OF DIALKYL HYDROGEN PHOSPHITES

Jesse Roger Mangham, Chesterfield County, Va., assignor to Virginia-Carolina Chemical Corporation, Richmond, Va., a corporation of Virginia No Drawing. Application September 22, 1953
Serial No. 381,743

10 Claims. (Cl. 260—461)

This invention relates to a process for the production of dialkyl hydrogen phosphites and more particularly to a process in which the reaction between the alcohol and phosphorus trichloride is carried out in the presence of an inert solvent.

An object of the invention is to provide an economically feasible process for the production of the dialkyl hydrogen phosphites on a commercial scale.

A further object is the commercial production of dialkyl hydrogen phosphites in simple equipment which does not involve specially designed refrigeration apparatus nor include cumbersome and hazardous solvent-recovery systems. An additional object is the preparation of dialkyl hydrogen phosphites in a continuous manner in high yield and in a state of high purity.

It has been proposed previously to make dialkyl hydrogen phosphites, in which the alkyl group contains from 1 to 5 carbon atoms, by reacting the respective alcohols with phosphorus trichloride in the presence of liquid butane. The butane acts principally as a refrigerant, i. e. by evaporation from the reaction mixture it serves to remove the heat of the reaction. It has also been proposed to make dialkyl hydrogen phosphites, in which the alkyl group contains from 1 to 3 carbon atoms, by spraying a mixture of the reactants and the volatile refrigerant—alcohol, phosphorus trihalide and a volatile organic compound—into a reaction chamber. Still another proposal has been to react phosphorus trichloride and methanol in the presence of methyl chloride, the latter vaporizes from the mixture and is continuously recycled to carry off the heat of reaction and hydrogen chloride.

These prior processes involve certain disadvantages among which (1) the necessity of handling large volumes of volatile materials which requires large pumping capacities; (2) the difficult but absolutely necessary removal of corrosive hydrogen chloride before recycling the refrigerants, e. g., butane and methyl chloride; (3) the unexpected and difficult-to-control pressure surges which occur when large volumes of volatile materials are present in exothermic reactions; and (4) the expensive compressor equipment needed in one process to reliquify the volatile methyl chloride in the presence of corrosive hydrogen chloride.

Now I have found that by carrying out the process in the presence of a relatively large volume of an inert solvent which has certain well defined physical properties, and without reliance upon cooling of the reaction mixture by evaporation of the solvent, many of the difficulties involved in the evaporative cooling processes are avoided and a commercially useful process is provided.

The overall reaction involved in the production of the dialkyl hydrogen phosphites in accordance with my invention is represented by the equation:

$$3ROH + PCl_3 \rightarrow (RO)_2POH + 2HCl + RCl$$
(R is an alkyl group)

In carrying out the process the phosphorus trichloride is added with stirring and cooling to at least the theoretically equivalent amount of the alcohol dissolved in an inert, relatively nonvolatile, mutual solvent for the alcohol and the phosphorus trichloride in which the resulting dialkyl hydrogen phosphite product is relatively insoluble. A relatively large proportion of the inert solvent is used which serves to provide a high dilution of the reactants which in turn facilitates rapid removal of the dialkyl hydrogen phosphite product and, due to the large volume, facilitates the removal of the heat of reaction by the ability to use a large cooling surface in contact with the reaction mixture. Generally the volume of solvent present in the reaction mixture is at least five times the volume of the reactants.

The invention is particularly applicable for the production of dialkyl hydrogen phosphites in which the alkyl group contains less than 9 carbon atoms. It is more useful for the production of the lower members and less useful and less needed for the production of the higher members. In fact with alkyls containing four and more carbon atoms a serious question arises as to whether it is more economical to operate the process with solvent, balancing the resulting high yield against the increased cost of operation, or to operate without solvent, balancing the lower yield against the lower cost of operation. Although there is no theoretical or fundamental basis for limitation of the invention to the lower alkyls it appears highly improbable at present that the process will be found to be economically useful with alkyls containing more than 8 carbon atoms. Even at 4 carbons (butyl) fair yields are obtainable without the use of solvent. The process is therefore especially adapted to the production of dialkyl hydrogen phosphites in which the alkyl group contains from 1 to 3 carbon atoms, i. e., methyl, ethyl, propyl and isopropyl.

The process is adapted to be operated either continuously or batch-wise.

In the continuous-type process the alcohol and phosphorus trichloride are metered simultaneously into the reaction chamber and the product is separated continuously from the solvent layer. In the batch-type or semi-continuous process the alcohol is charged first, the phosphorus trichloride is then added, and the product is separated from the solvent layer. The temperature in either type process is held in the range of 5° C. to 50° C. and preferably in the range of 5° C. to 15° C. by external refrigeration as by the use of cooling coils submerged in the reaction mixture or a cooling jacket on the reaction vessel. The dialkyl hydrogen phosphite which separates out of the reaction solution is removed from the reaction chamber and transferred to an evacuated vessel where most of the hydrogen chloride and alkyl chloride formed in the reaction are swept out. The crude dialkyl hydrogen phosphite product is then vacuum distilled. An alternate scheme is to add ammonia to the crude product to neutralize the last traces of hydrogen chloride, alkyl dihydrogen phosphite, phosphorous acid and other acids present therein. After removal of the ammonium salts by filtration, centrifugation or other suitable means the ester may be used as it is or vacuum distilled for further purification.

The unique feature of this process is the use of the proper inert, relatively non-volatile solvent. For optimum reaction conditions which will lead to the highest yields of high purity products the solvent should possess the following physical properties.

(1) The solvent must have relatively high solvent power for the reactants, phosphorus trichloride and the alcohol in question, at the normal operating temperature, 5° C. to 50° C. This promotes intimate contact between the reactants.

(2) The product dialkyl hydrogen phosphite as formed in the reaction must be essentially insoluble in the solvent. This permits rapid, continuous separation of the product from the reaction vessel so that the corrosive hydrogen chloride can be quickly eliminated and in order that the solvent can be used continuously.

(3) The solvent must have sufficient difference in density from the density of the product dialkyl hydrogen phosphite as formed to permit rapid separation of layers. More convenient operation is attained when the phosphite ester has a greater density than the solvent and thus settles out of the reaction mixture at the bottom of the reactor where it can be easily withdrawn. In this case the reactants are added at the top of the reaction chamber and do not come in contact with the already formed product. If the solvent is heavier than the product, the reactants are preferably added near the bottom of the reactor and the supernatant product layer is withdrawn as it accumulates.

(4) The boiling point of the solvent should be sufficiently different from the boiling points of the products of reaction, i. e., hydrogen chloride, alkyl chloride, and dialkyl hydrogen phosphite, to permit ready separation of the products and by-products from the solvent. It is preferred that the solvent boil above both the hydrogen chloride and alkyl chloride. It is immaterial, however, whether the solvent boils above or below the dialkyl hydrogen phosphite as long as it is sufficiently different to permit relatively easy fractionation. The preferred boiling ranges of the solvents are set as 60° C. from the boiling points of the corresponding alkyl chloride, or dialkyl hydrogen phosphite. In actual practice industrial fractionating columns could reduce this acceptable spread to about 10° C.

(5) It is preferred that the solvent be substantially insoluble in the product dialkyl hydrogen phosphite and thus practically no solvent is removed when the product is withdrawn.

Very few solvents meet the stringent specifications for the successful commercial production of any particular dialkyl hydrogen phosphite. It is obvious that some solvents may meet certain of the required specifications and not others. These solvents may be operable in the process but because of their one or two disadvantageous properties, they should not be economically competitive with a preferred solvent which meets the entire list of stringent specifications.

There are four general classes of organic solvents operable in my process for production of dialkyl hydrogen phosphites. The process is not limited to these classes as any class of solvent or individual solvents whose properties fall within the list of restrictions cited above will be operable in my process. The classes are petroleum solvents, cycloparaffins, ethers, and fluorocarbons. Solvents such as benzene, toluene, xylene, methylene chloride, chloroform, carbon tetrachloride, ethylene chloride, lauryl chloride, butyl bromide, decyl bromide, diethyl ether, dioxan, nitromethane, nitrobenzene, and 2-methyltetrahydrofuran are not suitable since they are miscible with the dialkyl hydrogen phosphites.

A. DIMETHYL HYDROGEN PHOSPHITE (1) *Petroleum solvents.*—Commercial hexane (B. P. 65–7° C.) and hexyl ether (B. P. 226° C.) have been shown (see Examples I, II, and III) to be preferred solvents. Certain other solvents have been found generally suitable for use in the process; however, each has some limitations.

Butane, which is the preferred internal diluent-refrigerant in a previously reported process for production of dimethyl hydrogen phosphite, does not satisfy the requirements for a suitable solvent in my process because methanol is only slightly soluble in butane at the reaction temperature. Also butane vaporizes together with the by-products methyl chloride and hydrogen chloride and thereby major amounts of solvent are lost.

Pure pentane (B. P. 36° C.) is a little too low boiling for convenient use. A petroleum ether (B. P. 30–60° C.) has been shown to be a poor solvent for methanol. On this basis commercial pentane was estimated to be a poor solvent. However, a particular pentane product (B. P. 35–6° C.) and another variety of petroleum ether proved to be good solvents for methanol. In light of this, it is appropriate to emphasize that commercially available petroleum solvents vary widely in solubility characteristics due to different isomeric composition. Consequently, the operability of a petroleum solvent cannot be determined entirely from its boiling point.

Other petroleum solvents which are reasonably useful are heptane (B. P. 98° C.), octane (B. P. 126° C.), and even nonane (B. P. 151° C.). These solvents suffer both the limitations of poor solvent power for methanol and from having boiling points which are progressively closer to that of dimethyl hydrogen phosphite. Decane (B. P. 174° C.) undecane (B. P. 194° C.) etc. to eicosane (B. P. 360° C.) could be used as higher boiling solvents. All of these are limited by their poor solubilizing power for methanol.

Hexadecane through eicosane are further limited by their high melting points, i. e., 18–36° C. and when used in my process their melting temperatures would serve as a lower limit of operability. Mineral oils which have carbon contents of about $C_{16}$–$C_{20}$, but lower melting points than the normal paraffins, would have the limitations of poor solubilizing power for methanol and rather high viscosities.

(2) *Ethers.*—Dibutyl ether (B. P. 142° C.) has satisfactory solubility characteristics and should be operable in the process. However, it boils somewhat too close to dimethyl hydrogen phosphite to be optimal. Amyl ether (B. P. 190° C.) boils above dimethyl hydrogen phosphite and somewhat too close to it to be a preferred solvent. It has the proper solvency characteristics. Hexyl ether (B. P. 226° C.) as already mentioned is a preferred solvent—it boils 60° C. above dimethyl hydrogen phosphite. Heptyl ether (B. P. 262° C.) and dioctyl ether (B. P. 292° C.) may be used. Of the lower molecular weight ethers, dimethyl, diethyl and dipropyl ethers are unsatisfactory because they dissolve dimethyl hydrogen phosphite. Mixed ethers, i. e. those containing different alkyl groups, may be used satisfactorily in this process if selection is made for proper solvent action and boiling point.

(3) *Cycloparaffins.*—Another group of inert solvents, the cycloparaffins, can be used for the process. Cyclohexane (B. P. 81° C.) is satisfactory as to its boiling point but has too poor solubility for methanol to be a preferred solvent. Methylcyclohexane (B. P. 101° C.) and ethylcyclohexane (B. P. 131° C.) dissolve methanol only poorly and are too high boiling to be optimal; however, both are usable.

(4) *Fluorocarbons.*—Generally speaking fluorocarbons which have the proper boiling points are usable in the process but generally are poor solvents for methanol. The fluorocarbons have a greater density than dimethyl hydrogen phosphite, and, therefore, in actual practice products of reaction form a top layer. Perfluoromethylcyclohexane (B. P. 76° C.) and perfluorokerosene (B. P. 195–275° C.) have been tested with regard to solubility properties. The former is reasonably suitable for a low boiling solvent and the latter is suitable for a high boiling solvent provided a narrow high boiling cut is taken to prevent contamination of the dimethyl hydrogen phosphite.

B. DIETHYL HYDROGEN PHOSPHITE (1) *Petroleum solvents.*—Tetradecane (B. P. 252° C.) and pentadecane (B. P. 270° C.) or petroleum solvents boiling in this range are preferred solvents for preparation of diethyl hydrogen phosphite. A petroleum solvent having a boiling range of 230–60° C. was used in actual processing (see Example IV) and shown to be a workable solvent. For plant operation a solvent boiling slightly higher (e. g. 265° C.) would permit easier separation of the diethyl hydrogen phosphite reaction product from the solvent.

In the lower boiling petroleum range, a petroleum ether (B. P. 30–60° C.) appeared to have proper solvent properties. However, another type of petroleum ether and a commercial pentane boiling in the same range were unsatisfactory since diethyl hydrogen phosphite was soluble in both. Commercial operation with a solvent in this range requires a careful selection from the many available.

If fractionation of the solvent is acceptable, fairly useful solvents in the low boiling range include octane (B. P. 126° C.) through decane (B. P. 174° C). In the higher boiling range undecane (B. P. 194° C.) to eicosane (B. P. 360° C.) can be used. Hexadecane through eicosane are limited to their high melting points, i. e., 18–36° C. Mineral oils which have carbon contents equal to these or even higher but of branched structure and lower melting points can be used.

(2) *Fluorocarbons.* — Generally fluorocarbons which have proper boiling points are usable in the process. All that were tried were limited to a poor solvent power for ethanol. Fluorocarbon solvents have a greater density than diethyl hydrogen phosphite, and, therefore, in actual practice products of reaction form a top layer. Withdrawal of the top layer requires an appropriately placed outlet. Perfluorodimethylcyclohexane (B. P. 102° C.) and perfluorokerosene (B. P. 195–275° C.) were tested with regard to solvent properties. The former is reasonably suitable for a low boiling solvent and the latter is suitable for a high boiling solvent provided a narrow high-boiling cut is taken to prevent contamination of the diethyl hydrogen phosphite.

C. DIPROPYL HYDROGEN PHOSPHITE (1) *Petroleum solvents.*—A mineral oil boiling in the octadecane- (B. P. 317° C.) eicosane (B. P. 360° C.) range is the preferred type of solvent for preparation of dipropyl hydrogen phosphite. A mineral oil boiling above 350° C., viscosity approximately 125 centipoises, was used in actual processing (see Example V) and shown to be a satisfactory solvent. A heavier mineral oil did not dissolve propanol quite as well as the lighter oil and was somewhat limited in actual practice by its rather high viscosity (approximately 350 centipoises).

(2) *Fluorocarbons.*—Generally speaking fluorocarbons which have the proper boiling points are usable in the process. All that were tried were limited by poor solubilizing power for propanol. Fluorocarbon solvents have a greater density than dipropyl hydrogen phosphite, and, therefore, in actual practice, products of reaction form a top layer. Withdrawal of the top layer during operation is required. Perfluorodimethylcyclohexane (B. P. 102° C.) and perfluorokerosene (B. P. 195–275° C.) were tested with regard to solubility properties. The former is reasonably suitable for a low boiling solvent and the latter is usable for a high boiling solvent provided a narrow high-boiling cut is taken to prevent contamination of the dipropyl hydrogen phosphite.

D. DIISOPROPYL HYDROGEN PHOSPHITE (1) *Petroleum solvents.*—A petroleum solvent containing primarily octadecane (B. P. 317° C.), nonadecane (B. P. 330° C.) and eicosane (B. P. 360° C.) was used in a laboratory preparation of diisopropyl hydrogen phosphite. Since the freezing point of the mixture was about 25° C. the process was run at 30° C. Better yields would probably have been obtained by operation at a lower temperature, e. g. 10–15° C. A light mineral oil of the type used to prepare dipropyl hydrogen phosphite (see above) is quite satisfactory for operation at 10–15° C. A heavier mineral oil would be limited by both a relatively high viscosity and poor solvent power for isopropanol.

(2) *Fluorocarbons.*—Generally speaking fluorocarbons having the proper boiling points are usable in the process. All that were tried were limited by a poor solvent power for isopropanol. Fluorocarbon solvents have a greater density than diisopropyl hydrogen phosphite, and, therefore, in actual practice products of reaction have to be withdrawn from a top layer. Perfluorodimethylcyclohexane (B. P. 102° C.) and perfluorokerosene (B. P. 195–275° C.) were tested with regard to solvent properties. The former is reasonably suitable for a low boiling solvent and the latter is usable for a high boiling solvent provided a narrow high-boiling cut is taken to prevent contamination of the diisopropyl hydrogen phosphite.

E. DIBUTYL HYDROGEN PHOSPHITE (1) *Fluorocarbons.*—Generally speaking fluorocarbons which have the proper boiling points are usable in the process. The one on which solubility tests were run was limited by a poor solvent power for butanol. Fluorocarbon solvents have a greater density than dibutyl hydrogen phosphite, and, therefore, in actual practice products of reaction have to be withdrawn from a top layer. Perfluorokerosene (B. P. 130–80° C.) was tested with regard to solvent properties. It is reasonably suitable for use as a solvent boiling above butyl chloride and below dibutyl hydrogen phosphite.

F. BIS(2-ETHYLHEXYL) HYDROGEN PHOSPHITE (1) *Fluorocarbons.*—Generally speaking fluorocarbons which have the proper boiling points are usable in the process. The one on which solubility tests were run was limited by its fairly poor solvent power for 2-ethylhexanol. Fluorocarbon solvents have a greater density than bis(2-ethylhexyl) hydrogen phosphite, and, therefore, in actual practice products of reaction have to be withdrawn from a top layer. Perfluorokerosene (B. P. 195–275° C.) was tested with regard to solvent properties. It is reasonably suitable for use as a solvent boiling above 2-ethylhexyl chloride and below bis(2-ethylhexyl) hydrogen phosphite provided a narrow high-boiling cut is taken to prevent contamination of the 2-ethylhexyl chloride by-product.

It is obvious from the above that for production of dialkyl phosphites higher in the series than diethyl hydrogen phosphite the choice of suitable solvents for my process becomes progressively more limited. However, the same basic principles apply and the process is applicable for higher molecular weight esters where suitable solvents are available.

Polyfluorocarbons and chlorofluorocarbons exhibit a characteristic poor compatibility with most organic compounds. For this reason solvents of this type are suitable for the production of dipropyl, dibutyl, diamyl, dihexyl, diheptyl, dioctyl, dinonyl, didecyl, diundecyl and didodecyl hydrogen phosphites if their other characteristics are suitable. From the economic point of view the cost of the fluorocarbon solvents would limit them considerably since any loss of solvent would add appreciably to the cost of manufacture.

From the practical point of view, use of this process for prepartion of dialkyl hydrogen phosphites above dioctyl although operable, is not economically or technically advantageous since the reactivity of the products with hydrogen chloride decreases with increasing molecular weight of the phosphite. Also the vigor of the reaction of phosphorus trichloride and the alcohol decreases as the molecular weight of the alcohol increases.

The examples which follow serve to illustrate the way the process is carried out in practice. Example I demonstrates the batch or semi-continuous type of operation. Example II illustrates the continuous type of operation.

Example I

PREPARATION OF DIMETHYL HYDROGEN PHOSPHITE USING HEXANE AS SOLVENT

A 1000 ml. three-neck flask was equipped with a stopcock on the bottom and with a dropping funnel, mechanical stirrer, gas outlet tube (protected against moisture with a drying tube) and means for external refrigeration. After it was charged with 825 ml. of commercial hexane (petroleum solvent, B. P. 60–70° C.) and 34.6 g. (1.08 moles) of anhydrous methanol 49.5 g. (0.36 mole) of phosphorus trichloride were added during about 45 minutes with the temperature maintained at 10±1° C. Shortly after the addition of phosphorus trichloride had begun an immiscible layer of dimethyl hydrogen phosphite collected on the bottom of the flask. The volume of this layer gradually increased until the end of the reaction. After the addition of phosphorus trichloride was complete the reaction mixture was stirred for an additional ten minutes. Stirring was then stopped and the lower phosphite layer drained off. It was transferred to a flask equipped with a mechanical stirrer and a train for evacuation of the flask by means of a water pump aspirator. It was stirred at 10±1° C. for 15 minutes under 50 mm. absolute pressure and then was allowed to come to atmospheric pressure and a gas addition tube was inserted. A trace of solid methyl red indicator was added to the crude ester and ammonia gas was slowly introduced with stirring and cooling at 10±1° C. until the solution was neutral as indicated by the color change of the indicator. The ester was then filtered free of ammonium salts and further purified by vacuum distillation. No forerun was obtained and little residue remained after distillation. The dimethyl hydrogen phosphite was collected as the main fraction (B. P. 69–71° C.) at 75 mm., whose refractive index was 1.4002 at 24° C. The yield of distilled ester of this first batch was 43%.

A second batch of ester was made in the same way as the first utilizing the same reaction vessel and the same body of solvent. The yield of distilled product in this case increased to 64%.

A third batch run in the same manner as the second resulted in a 75% yield of the desired dimethyl hydrogen phosphite.

Subsequent runs were made in a similar fashion and data was collected for ten successive runs utilizing the same solvent without addition of fresh solvent. Yields of runs 4–10 were as follows: 68, 83, 76, 64, 88, 80, and 76%. It is evident then that the first two runs serve to "condition" or saturate the solvent with products of reaction. Yields of subsequent runs were fairly uniform and there was no sign of a drop off in yield. At the end of these ten runs a total of 40 ml. of hexane was required to bring the volume of the solvent back to its original level. In other words an average of only 4 ml. of hexane was lost with each 30 g. of product. Of particular interest in this connection is that there was no "build-up" of waste products in the hexane reaction medium. In commercial scale operation even this small loss of solvent could be reduced by stripping solvent from the by-product methyl chloride and hydrogen chloride.

Example II

PREPARATION OF DIMETHYL HYDROGEN PHOSPHITE USING HEXANE AS SOLVENT

The 11th run in the above reaction series was run in the same solvent and in the same reaction vessel. However, the mode of addition of methanol was changed.

In one dropping funnel was placed 34.6 g. (1.08 moles) of anhydrous methanol and in another was placed 49.5 g. (0.36 mole) of phosphorus trichloride. A tube was connected to the stopcock on the bottom of the flask and as methanol and phosphorus trichloride were gradually added in stoichiometric amounts (measured by volumetric calibrations on dropping funnels) the ester which separated was continuously withdrawn. During the addition which took 45 minutes, the temperature was maintained at 10±1° C. as in the previous batch or semi-continuous runs. After the addition of the reagents was completed, stirring was continued five minutes longer and the ester which separated from the reaction solution was withdrawn. The crude ester was purified as before. The yield was 72% of the theoretical amount.

Example III

PREPARATION OF DIMETHYL HYDROGEN PHOSPHITE USING HEXYL ETHER AS A SOLVENT

Materials used:
  49.5 g.=0.36 mole of phosphorus trichloride
  34.6 g.=1.08 moles of methanol
  600 ml. hexyl ether Procedure: The reaction was carried out in a 1000 ml. three-neck flask fitted with a bottom stopcock outlet, gas outlet tube with attached calcium chloride tube, thermometer, stirrer, dropping funnel and means for external refrigeration.

The hexyl ether was charged into the flask, and the methanol dissolved in the ether. Phosphorus trichloride was added dropwise to this mixture with stirring over a period of forty-five minutes at 15° C. After the addition was completed, the reaction mixture was stirred for an additional ten minutes at 15° C. and then was allowed to stand for five minutes at 15° C. during which time the product dimethyl hydrogen phosphite settled to the bottom and was drawn off.

After running three batches, the volume of the solvent and of product had increased to a maximum and levelled off. Three additional batches were then run through, and processed by evacuating for fifteen minutes at 50 mm. and 15° C. to remove hydrogen chloride, neutralized by bubbling in anhydrous ammonia, filtered and then vacuum distilled. An average yield of 78% of dimethyl hydrogen phosphite of 95% purity was obtained. About 10 g. of hexyl ether was recovered as a residue from the distillation of each batch.

Example IV

PREPARATION OF DIETHYL HYDROGEN PHOSPHITE USING A PETROLEUM SOLVENT IN THE TETRADECANE RANGE

Materials used:
  46.07 g.=1 mole of ethanol, absolute
  45.8 g.=0.333 mole of phosphorus trichloride
  600 ml. petroleum solvent, B. P. 238–250° C. (commercial tetradecane)

Procedure: The reaction was carried out in a 1000 ml. three-neck flask fitted with a bottom stopcock outlet, gas outlet tube with attached calcium chloride tube, thermometer, stirrer, dropping funnel and means for external refrigeration.

The petroleum solvent (tetradecane range) was charged into the flask and the ethyl alcohol dissolved in the oil. Phosphorus trichloride was added dropwise to this mixture with stirring over a period of forty-five minutes at 15° C. The reaction mixture was stirred for an additional ten minutes at 15° C., and then allowed to stand for five minutes at 15° C., during which time the product diethyl hydrogen phosphite settled to the bottom and was drawn off. After running two batches, the volumes of the solvent and product had become essentially constant. Three additional batches were then run through, and processed by evacuating for fifteen minutes at 50 mm. and 15° C. to remove hydrogen chloride, neutralized by bubbling in anhydrous ammonia gas, filtered free of ammonium chloride, and vacuum distilled. An average yield of 76% of diethyl hydrogen phosphite of 90–91% purity was obtained. About three grams of solvent was recovered as a residue from the distillation of each batch.

Example V

PREPARATION OF DIPROPYL HYDROGEN PHOSPHITE USING A MINERAL OIL SOLVENT

Materials used:
45.06 g.=0.75 mole of propanol
34.4 g.=0.25 mole of phosphorus trichloride
500 ml. white mineral oil, N. F., light, B. P. 380° C.–450° C.

Procedure: The reaction was carried out in a 1000 ml. three-neck flask fitted with a bottom stopcock outlet, a stirrer, gas outlet tube with attached calcium chloride tube, thermometer, dropping funnel and means for external refrigeration. The white mineral oil was charged into the flask, and the propanol dissolved in the oil. The phosphorus trichloride was added dropwise to this mixture with stirring over a period of forty-five minutes at 15° C. After the addition was completed, the reaction mixture was stirred for an additional ten minutes at 15° C. and then was allowed to stand for five minutes at 15° C. during which time the product dipropyl hydrogen phosphite settled to the bottom of the flask, and was drawn off.

After running three batches, the volume of the solvent had increased to a maximum and levelled off. Two additional batches were run through in the above manner. Each batch was processed by evacuating for fifteen minutes at 50 mm. and 15° C. to remove hydrogen chloride, diluted with 25 ml. of hexane, neutralized by bubbling in anhydrous ammonia at 15° C., filtered free of ammonium chloride, washed with hexane, and then vacuum distilled. From the three runs an average yield of 77% of dipropyl hydrogen phosphite of 94% purity was obtained. Approximately 1 g. of mineral oil was recovered as a residue on distillation of each batch of product.

Example VI

PREPARATION OF DIISOPROPYL HYDROGEN PHOSPHITE USING A PETROLEUM SOLVENT IN THE OCTADECANE-EICOSANE RANGE

Materials used:
45.06 g.=0.75 mole of isopropanol
34.4 g.=0.25 mole of phosphorus trichloride
500 ml. $C_{18}$–$C_{20}$ (paraffin oil), B. P. 317°–360° C.

Procedure: The reaction was carried out in a 1000 ml., three-neck flask fitted with a bottom stopcock outlet, gas outlet tube with attached calcium chloride tube, thermometer, stirrer, dropping funnel and means for external refrigeration.

The paraffin oil was charged into the flask, and the isopropanol dissolved in the oil. Phosphorus trichloride was added dropwise to this mixture with stirring over a period of forty-five minutes at 30° C. The reaction mixture was stirred for an additional ten minutes at 30° C., and then allowed to stand for five minutes at 30° C. during which time the product, diisopropyl hydrogen phosphite, settled to the bottom and was drawn off. After running three batches, the volume of solvent and of product had levelled off. Three additional batches were then run through and processed by evacuating for fifteen minutes at 50 mm. and 30° C. to remove hydrogen chloride, diluted with 25 ml. of hexane, neutralized by bubbling in anhydrous ammonia gas at 30° C., filtered, washed with hexane, and vacuum distilled. An average yield of 75% of diisopropyl hydrogen phosphite of 94–97% purity was obtained. About three grams of paraffin oil was recovered as a residue on distillation of each batch.

It was found necessary to add 25 ml. of hexane to each batch before neutralization to facilitate handling.

In view of the importance of the boiling points of the solvents used in the process the following table of boiling point data has been compiled. The solvents preferably should boil well above the boiling point of the alkyl halide by-products and (a) well below the dialkyl hydrogen phosphite products, or (b) well above the dialkyl hydrogen phosphite. Boiling points are at atmospheric pressure in degrees centigrade. In the cases of the higher molecular weight derivatives, the data are extrapolated from known data obtained from vacuum distillation. The preferred boiling ranges of the solvents are set as 60° C. from the boiling points of the corresponding alkyl chloride or dialkyl hydrogen phosphite. In actual practice industrial fractionating columns could reduce this permissible spread to about 10° C. The following table illustrates both "preferred" and "permissible" ranges.

| Dialkyl hydrogen phosphite | B.P. of phosphite, °C. | B.P. of alkyl chloride, °C. | Boiling range of low boiling solvent (a) | | Boiling range of high boiling solvent (b) | |
|---|---|---|---|---|---|---|
| | | | Preferred, °C. | Permissible, °C. | Preferred, °C. | Permissible, °C. |
| Dimethyl | 165 | −24 | 35–105 | −15–155 | Above 225 | Above 175. |
| Diethyl | 188 | 13 | 75–130 | 25–180 | Above 250 | Above 200. |
| Dipropyl | 215 | 46 | 105–155 | 55–205 | Above 275 | Above 225. |
| Diisopropyl | 189 | 36 | 95–130 | 45–180 | Above 250 | Above 200. |
| Dibutyl | 260 | 78 | 140–200 | 90–250 | Above 320 | Above 270. |
| Bis(2-ethylhexyl) | 350 | 180 | 240–290 | 190–340 | Above 410 | Above 360. |

I claim:

1. Process for the production of a dialkyl hydrogen phosphite which comprises reacting an alcohol containing from 1 to 3 carbon atoms with $PCl_3$ in the presence of a volume of an inert solvent which is at least 5 times the sum of the volumes of the alcohol and the $PCl_3$, said solvent being selected from the group consisting of hexane, commercial tetradecane having a boiling range of from 238° C. to 250° C., mineral oil having a boiling range of from 380° C. to 450° C., paraffin oil having a boiling range of from 317° C. to 360° C. and hexyl ether, and maintaining the reaction mixture at a temperature within the range from 5° C. to 50° C. by external refrigeration.

2. Process as defined in claim 1 in which the alcohol is methyl alcohol and the solvent is hexane.

3. Process as defined in claim 1 in which the alcohol is methyl alcohol and the solvent is hexyl ether.

4. Process as defined in claim 1 in which the alcohol is ethyl alcohol and the solvent is commercial tetradecane having a boiling range of from 238° C. to 250° C.

5. Process as defined in claim 1 in which the alcohol is propyl alcohol and the solvent is a mineral oil having a boiling range of from 380° C. to 450° C.

6. Process as defined in claim 1 in which the alcohol is isopropyl alcohol and the solvent is paraffin oil having a boiling range of from 317° C. to 360° C.

7. Process as defined in claim 1 in which the dialkyl hydrogen phosphite is separated from the solvent by gravity separation and more alcohol and $PCl_3$ are reacted in the same solvent.

8. Process as defined in claim 7 in which alcohol and $PCl_3$ are fed continuously to a batch of solvent and dialkyl hydrogen phosphite is continuously separated by gravity from said batch of solvent.

9. Process as defined in claim 7 in which the solvent is of lower specific gravity than the dialkyl hydrogen phosphite and the alcohol and $PCl_3$ are introduced downwardly into a body of solvent.

10. Process as defined in claim 1 in which the solvent boils at a higher temperature than the by-product alkyl chloride and at a temperature differing from the boiling temperature of the dialkyl hydrogen phosphite by at least about 10° and in which crude dialkyl hydrogen phosphite is separated from the solvent by gravity and purified from alkyl chloride and solvent by fractionation.

References Cited in the file of this patent

UNITED STATES PATENTS 2,226,552     Conary et al.            Dec. 31, 1940

OTHER REFERENCES

Kosolapoff, Organophosphorus Compounds, John Wiley & Son, New York (1950), pp. 182 and 183.